United States Patent
Aimura et al.

(10) Patent No.: US 9,321,399 B2
(45) Date of Patent: Apr. 26, 2016

(54) SURROUNDING AREA MONITORING DEVICE FOR VEHICLE

(75) Inventors: Makoto Aimura, Saitama (JP); Nobuharu Nagaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 531 days.

(21) Appl. No.: 13/580,014

(22) PCT Filed: Feb. 21, 2011

(86) PCT No.: PCT/JP2011/000949
§ 371 (c)(1),
(2), (4) Date: Aug. 20, 2012

(87) PCT Pub. No.: WO2011/108218
PCT Pub. Date: Sep. 9, 2011

(65) Prior Publication Data
US 2012/0314074 A1   Dec. 13, 2012

(30) Foreign Application Priority Data

Mar. 1, 2010   (JP) ................................ 2010-044475

(51) Int. Cl.
*B60R 1/00* (2006.01)
*G06T 7/00* (2006.01)
(Continued)

(52) U.S. Cl.
CPC ... *B60R 1/00* (2013.01); *G01C 3/14* (2013.01); *G06K 9/00362* (2013.01); *G06K 9/00805* (2013.01); *G06T 7/0075* (2013.01); *G08G 1/166* (2013.01); *B60R 2300/105* (2013.01);
(Continued)

(58) Field of Classification Search
USPC ...................................................... 348/42–60
See application file for complete search history.

(56) References Cited

U.S. PATENT DOCUMENTS 6,327,536 B1   12/2001  Tsuji et al.
6,535,242 B1 *  3/2003  Strumolo et al. ............. 348/148
(Continued)

FOREIGN PATENT DOCUMENTS

CN    1922641 A    2/2007
EP    2023267 A1   2/2009
(Continued)

OTHER PUBLICATIONS

EP Search Report dated Jan. 3, 2014 issued in corresponding EP application 11 750 332.6.
(Continued)

*Primary Examiner* — Michael Teitelbaum
(74) *Attorney, Agent, or Firm* — Carrier Blackman & Associates, P.C.; Joseph P. Carrier; Jeffrey T. Gedeon

(57) ABSTRACT

A surrounding area monitoring apparatus, which is built into a vehicle, images the area surrounding the vehicle and detects physical objects in the area surrounding the vehicle based on the image taken. The apparatus determines whether the detected physical object is a pedestrian or an animal, and a warning is given to the driver of the vehicle if the determined physical object is present within a specified area from the vehicle. If it is determined that the detected physical object is an animal and that the animal is present within the specified area, the warning in continued for a specified period even after the animal has left the specified area. Since animals have habits of behaving in a herd, the risk of lurking animals can be brought to the driver's attention by the continuation of the warning.

19 Claims, 8 Drawing Sheets

(51) Int. Cl.
*G08G 1/16* (2006.01)
*G06K 9/00* (2006.01)
*G01C 3/14* (2006.01)

(52) U.S. Cl.
CPC ..... *B60R2300/305* (2013.01); *B60R 2300/307* (2013.01); *B60R 2300/8093* (2013.01); *G06T 2207/10012* (2013.01); *G06T 2207/10048* (2013.01); *G06T 2207/30196* (2013.01); *G06T 2207/30261* (2013.01)

(56) References Cited

U.S. PATENT DOCUMENTS

| | | | |
|---|---|---|---|
| 7,949,151 B2 | 5/2011 | Taniguchi et al. | |
| 7,982,748 B2 | 7/2011 | Taniguchi et al. | |
| 8,005,266 B2 | 8/2011 | Saka et al. | |
| 2002/0145519 A1* | 10/2002 | Hykawy | 340/567 |
| 2007/0211919 A1 | 9/2007 | Nagaoka et al. | |
| 2008/0224837 A1 | 9/2008 | Meyer et al. | |
| 2009/0102858 A1 | 4/2009 | Eggers et al. | |
| 2010/0020170 A1 | 1/2010 | Higgins-Luthman et al. | |

FOREIGN PATENT DOCUMENTS

| | | |
|---|---|---|
| JP | 2001-006096 A | 1/2001 |
| JP | 2001-023091 A | 1/2001 |
| JP | 2007-241740 A | 9/2007 |
| JP | 2007-310705 A | 11/2007 |
| JP | 2007-310706 A | 11/2007 |
| JP | 2007-334751 A | 12/2007 |
| JP | 2008-021035 A | 1/2008 |
| JP | 2008-254710 A | 10/2008 |

OTHER PUBLICATIONS

Chinese Office Action dated Mar. 5, 2014 issued over the corresponding CN Patent Application No. 201180010526.2.

\* cited by examiner

SURROUNDING AREA MONITORING DEVICE FOR VEHICLE

FIELD OF THE INVENTION

The present invention relates to an apparatus for monitoring surrounding areas around a vehicle, more specifically to a device for detecting and displaying physical objects lying around the vehicle.

RELATED ART

In the following patent document 1, there is proposed so far a system in which a Head-Up Display (HUD) is installed and physical objects lying around a vehicle are detected using an infrared camera. The system highlights physical objects lying within a conflict determining area set in a traveling direction of the vehicle in a central area of a display screen of the HUD and displays physical objects lying within an intrusion determining area set outside of the conflict determining area with an icon in right and left areas of the display screen.

PRIOR ART DOCUMENT

Patent Document 1: Japanese Patent 4334686

SUMMARY OF THE INVENTION

Problem to be Solved

Where the physical object is an animal, some animals have the habit of behaving in a herd. Thus, even though a warning is provided by highlighting the detected physical object as described above, other animals following the detected physical object may lurk around the vehicle. Additionally, an animal such as a deer generally moves faster than a human being and its behavioral pattern is often beyond our expectations. Accordingly, even when the animal is successfully detected as a physical object, there may be a danger around the vehicle that a driver is not yet aware at this time. For that reason, it is desirable to draw the driver's attention to such a potential danger impending over the vehicle.

Consequently, where the physical object is an animal, a technique of providing a warning in a different manner from the warning provided when a pedestrian is desired, which takes full account of the animal's behavior.

Solution to the Problem

To solve the above-identified problem, according to an aspect of the present invention, the invention provides a surrounding area monitoring apparatus, which comprises imaging means, mounted on a vehicle, for capturing images around the vehicle; at least one detector for detecting a physical object lying around the vehicle based on an image captured by the imaging means. The apparatus includes means for determining if the detected physical object is a pedestrian or an animal and warning means for giving a warning to a driver of the vehicle when the physical object which is determined to be the pedestrian or to be the animal lying within a specified area from the vehicle, wherein if it is determined that the detected physical object is the animal and present within the specified area, the warning means continuously gives a warning for a specified period even after the animal has left the specified area.

As mentioned above, some animals have the habit of behaving in a herd. In some cases, an animal generally moves faster than a pedestrian and so it is difficult to predict its behavioral pattern. Thus, the animal or other animals may still be present around the vehicle, even after the detected animal has moved outside a specified area from the vehicle. According to the present invention, a warning is continuously given for a specified period even after the animal has moved outside the specified area, the present invention allows continuously drawing driver's attention to such a latent danger, thereby enhancing a degree of risk prediction of the driver.

According to another aspect of the present invention, further comprising means for determining whether the lying pedestrian is single or plural when it is determined that the detected physical object is the pedestrian and the pedestrian is present within the specified area; and the warning means gives a warning in a different mode between a case where the pedestrian is single and a case where the pedestrian is plural, and when it is determined that the detected physical object is an animal and is present within the specified area, the warning means gives a warning in the same mode regardless of whether the lying animal is signal or plural.

Generally speaking, a pedestrian does not have the habit of behaving in a herd like an animal. The pedestrian moves at a limited speed as compared with the animal. Where there is more than one pedestrians, when each pedestrian is individually highlighted with e.g., a frame etc., it becomes hard to see the display and, as a consequence, it is liable to becomes difficult to make a driver aware to which physical objects driver's attention should be paid. Therefore, it is preferable to individually highlight e.g., in a case where single pedestrian is detected, or to highlight over the entire screen e.g., in a case where plural pedestrians are detected, in lieu of such individual highlighting. On the other hand, where the physical object is an animal, because there is some possibility that the animal is behaving in a head as stated above, even when the detected animal is single, the animal is treated as plural (herd), and a warning is given in the same mode. This enables not only providing a driver with an easy-to-understand display where the physical object is a pedestrian but also making the driver aware a danger latent around the vehicle where the physical object is an animal.

Other features and advantages of the present invention will become apparent from the following detailed descriptions.

DESCRIPTION OF EMBODIMENTS

Hereinafter, a description will be made to embodiments of the present invention with reference to the accompanying drawings.

Figure 1:
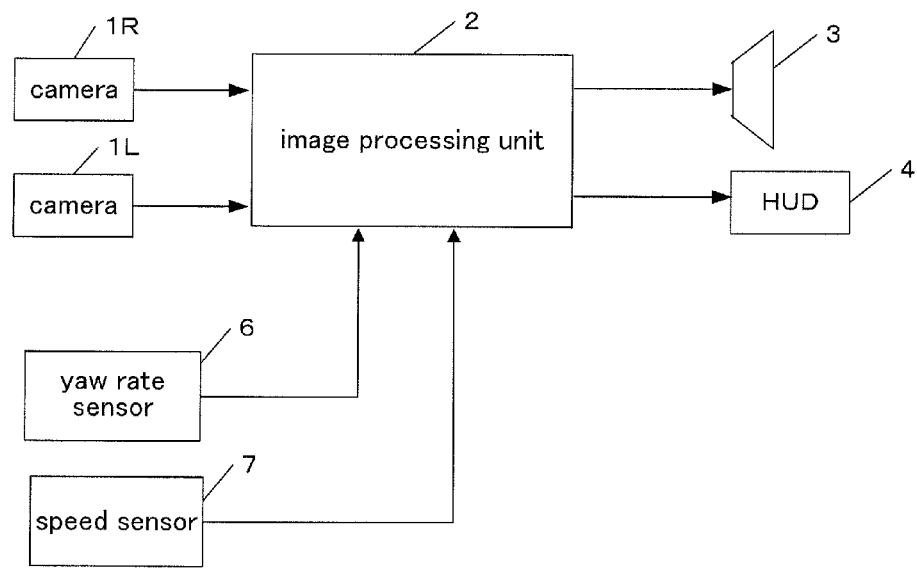
FIG. 1 is a block diagram showing a configuration of a surrounding area monitoring apparatus for vehicle according to one embodiment of the present invention.

FIG. 1 is a block diagram showing a configuration of a surrounding area monitoring apparatus for vehicle according to one embodiment of the present invention.

The device is mounted on a vehicle, and includes two infrared cameras 1R and 1L which can detect a far infrared ray, an image processing unit 2 for detecting physical objects around a vehicle based on image data taken by the cameras 1R and 1L, a speaker 3 for giving a warning by sound or by voice based on the detected results, and a Head Up Display (HUD, hereinafter referred for short as a HUD) 4 for displaying an image taken by the camera 1R or 1L for displaying to make a driver to aware the physical objects around the vehicle. Further, the device further includes a yaw rate sensor 6 for detecting a yaw rate of the vehicle, and a speed sensor 7 for detecting a traveling speed (vehicle speed) of the vehicle. The results detected by these sensors are sent to the image processing unit 2.

Figure 2:
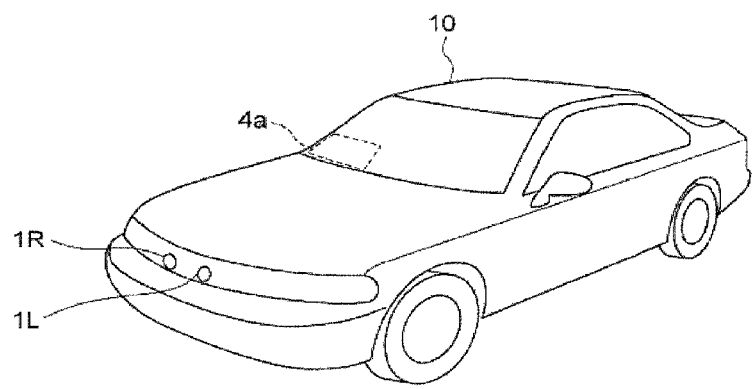
FIG. 2 is a view for describing a mounting position of a camera and a HUD according to one embodiment of the present invention.

In this embodiment, the cameras 1R and 1L are arranged at a position symmetry with respect to a central axis passing through the center of the vehicle width at the front of the vehicle 10, so as to take an image ahead of the vehicle 10, as shown in FIG. 2. The two cameras 1R and 1L are fixed to the vehicle so that the both optical axes are parallel with each other and the height of the both cameras from a road surface is equal. The infrared cameras 1R and 1L have characteristics that the higher the temperature of the physical objects, the higher the level of their output signals (i.e., brightness of picture taken increases).

The image processing unit 2 includes an A/D converter circuit for converting an analog signal into a digital signal, a image memory for storing a digitized image signal, a Central Processing Unit (CPU) for performing various arithmetic processing, a Random Access Memory (RAM) for storing data when the CPU executes an operation, a Read Only Memory (ROM) for storing a program to be executed by the CPU and data (including a table and a map) used, and an output circuit for outputting a drive signal to the speaker 3 and a display signal etc., to the HUD. It is configured that output signals from the cameras 1R and 1L are converted into digital signals and to input to the CPU. As shown in FIG. 2, the HUD 4 is provided so as to display a screen 4a at a forward position of a front window of the vehicle 10 relative to the driver. In this way, the driver can visually recognize the screen to be displayed on the HUD 4.

Alternatively, a general display device which is attached to a dashboard may e.g., be possible, in place of the HUD 4. For example, where the vehicle is equipped with a navigation system (not shown) implementing various capabilities of detecting a current position of the vehicle, calculating an optimum route to a destination, and displaying the current position and the optimum route concurrently with map information, the display device of the navigation system may be available.

Figure 3:
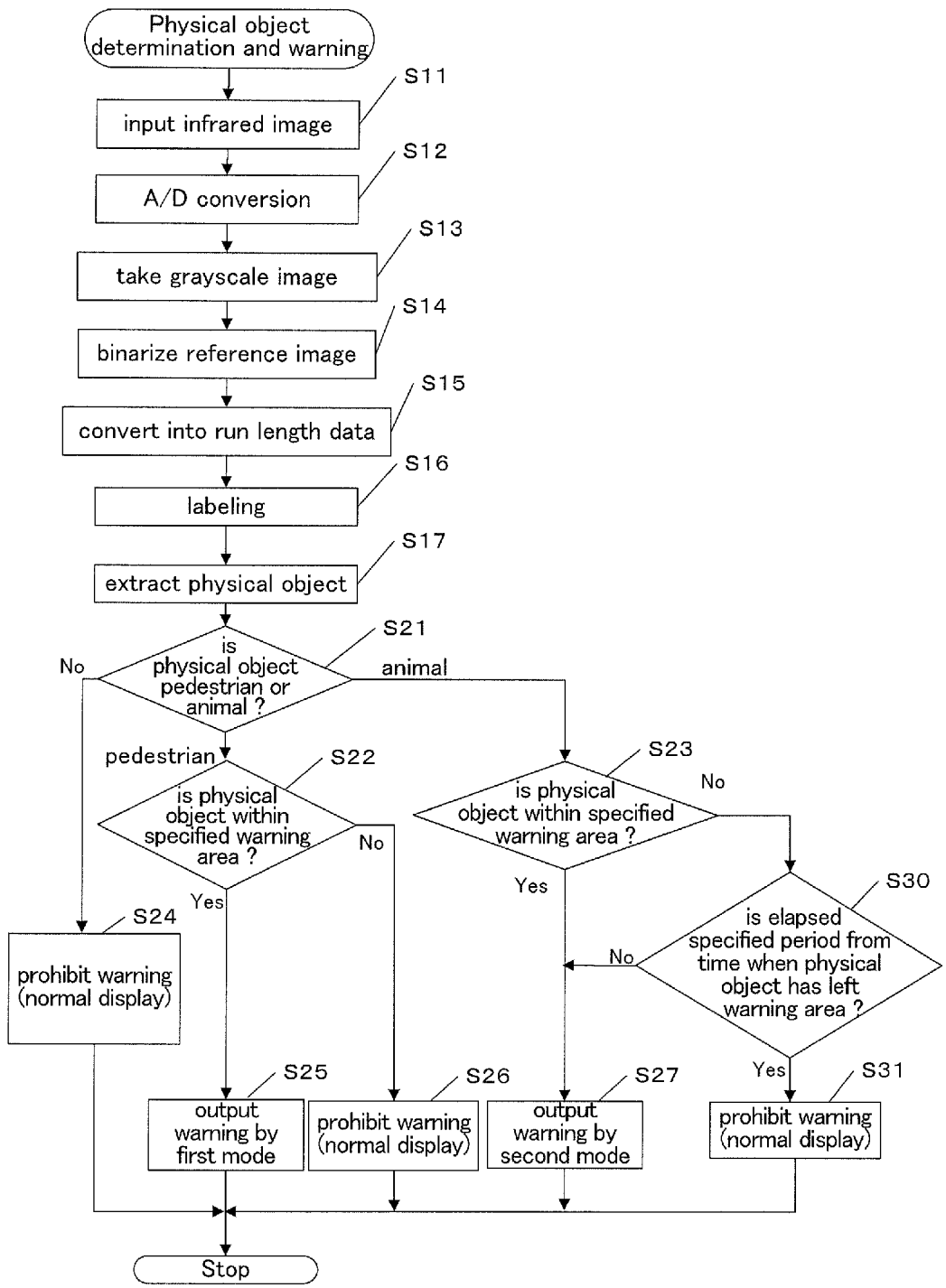
FIG. 3 is a flow chart showing a process of an image processing unit according to one embodiment of the present invention.

FIG. 3 is a flow chart showing a process to be executed by the image processing unit 2. The process is executed at specified intervals.

In steps S11 to S13, the image processing unit 2 receives output signals (i.e., data of image taken) from the cameras 1R and 1L as inputs thereto and the output signals are stored in the image memory after A/D conversion. The image data to be stored is a grayscale image containing brightness information.

In step S14, a right image taken by the camera 1R is taken as a reference image (in the alternative, a left image may instead be taken as a reference image), and an image signal is binarized. Specifically, processing is executed in which an area brighter than a luminance threshold ITH is set to "1" (white) and an area darker than the luminance threshold ITH is set to "0" (black). With this binarization processing, a physical object having temperature higher than given temperature, such as, e.g., a living body is extracted as a white area. The luminance threshold ITH can be determined with any proper technique.

In step S15, the binarized image data is converted into run length data. Specifically, the run length data is represented by coordinates of a start point (pixel at a left end of each line) in the white area (called as a line) of each pixel row and the length (indicated by the number of pixel) from the start point to an end point (pixel at a right side of each line) for areas that are changed into white by binarization. Here, a y axis is taken in a vertical direction and a x axis is taken in a horizontal direction in the image. For example, let us suppose here that the white area in a pixel line in which the y axis is 1 is a line extending from (x1,y1) to (x3,y1), the line is represented by run length data of (x1,y1,3) as the line is composed of three pixels.

In steps S16 and S17, processing is executed in which the physical objects are labeled and they are extracted. In other words, some lines of portions overlapping in a y direction out of lines that are converted into run length data are combined to regard them as one physical object, and then a label is attached to the physical object. Thusly, one or plural physical objects are extracted.

In step S21, determination is made to decide if the physical object is a pedestrian or an animal (typically, a tetrapod such as a deer and a bear, hereinafter referred simply as an animal) for each of the physical objects thus extracted. The process proceeds to step S22 if the extracted physical object is a pedestrian, or the process proceeds to step S23 if the detected physical object is an animal.

If all of the extracted physical objects are neither a pedestrian nor an animal (e.g., an artificial structure), a result of the determination made in step S21 is No. Then, the process proceeds to step S24 where a normal display is done in which a grayscale image taken in stet S13 is output on the display device 4 without giving a warning.

Herein, the processing of determining if the physical object is a pedestrian or an animal can be implemented using any proper technique. For example, similarity between the physical objects thus extracted as above and a specified pattern indicative of a pedestrian is calculated using the well-known pattern matching techniques. If the similarity is high, the physical object can be determined as a pedestrian. For an animal, the same techniques may be applied. As an example of such processing to determine whether the physical object is a pedestrian is disclosed e.g., in JP 2007-241740 A and JP 2007-334751 A, etc. Also, processing to determine whether the physical object is an animal is disclosed e.g., in JP 2007-310705 A and JP 2007-310706 A, etc.

Figure 4:
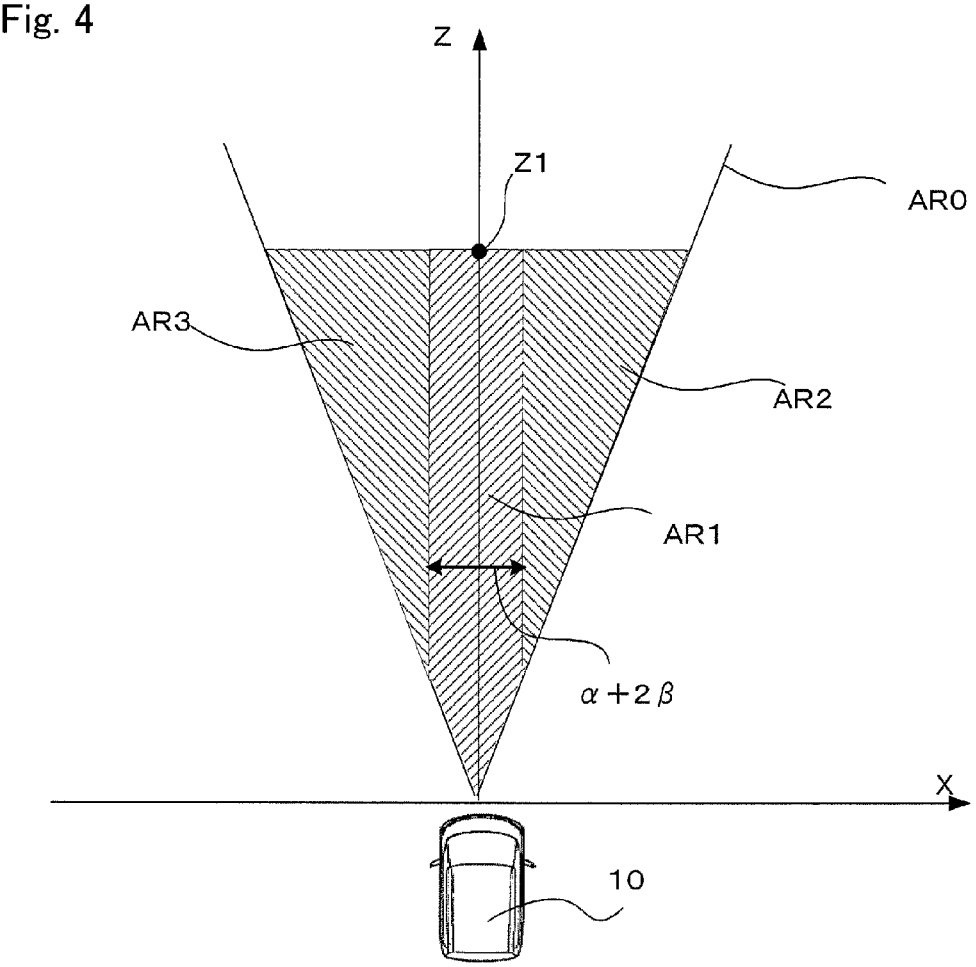
FIG. 4 is a view showing a warning area of a vehicle according to one embodiment of the present invention.

In step S22, the physical object which is determined to be a pedestrian is determined if it is positioned within a specified warning area from the vehicle. Similarly, in step S23, the physical object which is determined to be an animal is determined if it is positioned within the specified warning area. Herein, one example of the specified warning area is shown in FIG. 4.

An area AR0 indicates an imaging area that is an area imageable by the cameras 1R and 1L. Processing in steps S11 to S17 shown in FIG. 3 is executed to the image taken corresponding to the imaging area AR0.

An area AR1 is an area corresponding to an area to which a margin β (e.g., it may be set to about 50 to 100 cm or so) is added to the both areas of a vehicle width a of the vehicle 10. Put differently, the area is an area having a width of (α/2+β) at the both sides of a central axis in a vehicle width direction of the vehicle 10, which can be paraphrased as a conflict determining area having a high likelihood of colliding against the vehicle if the physical objects continue to lie there. Areas AR2 and AR3 are areas (outside in a lateral direction of the conflict determining area) having an absolute value of the X coordinates larger than the conflict determination area, and are an intrusion determination area, the physical objects within which being liable to intrude in the conflict determining area. A Z1 defining the size of the areas AR1 to AR 3 in an area direction can e.g., be set to a specified value.

In this embodiment, determination is made in steps S22 and S23 will be executed with the conflict determining area as the warning area. If a foot of the pedestrian, i.e. at least a part of the bottom of the physical object on the image is within the warning area, it is determined that the physical object is present within the warning area where the physical object is a pedestrian. The same holds true for the animal.

Alternatively, the center of gravity of the physical object may be found to determine whether the center of gravity is within the warning area. If the center of gravity is within the warning area, it may be determined that the physical object is positioned within the warning area.

In step S22, it is determined that at least one pedestrian is present within the warning area (Yes in step S22), a grayscale image is displayed on the display device 4 in step S25 and a warning is given to the pedestrian who is present within the warning area. Specifically, the warning output is implemented by individually highlighting each pedestrian who is present within the warning area of the image. Hereinafter, a mode in which each physical object is individually highlighted is called as a first mode.

In step S32, if no pedestrian is present who is determined to be present within the warning area (No in step S22), an indication is made to inform that no physical objects to which a special attention should be paid within the warning area. That is, a warning output is prohibited in step S26 and a normal display is done in the same way as step S24.

In this manner, where the physical object is a pedestrian, the pedestrian is highlighted, as far as the pedestrian is positioned within the warning area. The highlighting is prohibited at a point of time when the pedestrian has left the warning area.

On the other hand, if it is determined in step S23 that at least one animal is present within the warning area (Yes in step S23), a grayscale image is displayed on the display device 4 in step S27, and a warning is given to the animal positioned within the warning area in the image. Specifically, the warning output is implemented by highlighting the displayed entire grayscale image. Hereinafter, a mode in which the entire image is highlighted is called as a second mode.

In step S23, if no animals are present which are determined to be present within the warning area (No in step S23), determination is made in step S30 to decide if a specified period is elapsed after an animal has left the warning area. If the specified period is not yet elapsed (No in step S30), a warning is continuously given in step S27. That is, a grayscale image taken this time is displayed on the display device 4 and the entire image is highlighted. If the specified period is elapsed (yes in step S30), a warning output is prohibited in step S31. In this case, a normal display is made in the same way as step S24.

The determination whether the specified period is elapsed after the animal has left the warning area may be implemented, e.g., by tracking the physical object which is determined to be the animal. For example, during tracking of an animal, when the animal has left the warning area (e.g., when the animal presents out of the warning area in a process of the last time, and, when the animal presents within the warning area in a process of this time), the timer is started and clocks an elapsed time from the time when the animal has left the warning area. It becomes possible to determine whether the specified period is elapsed by referring to the timer. In this connection, the tracking technique is disclosed e.g., in JP 2001-6096 A.

Then, a warning is continuously given for the specified period from a point of time when the animal has left the warning area, even when the animal has already left the warning area, after it is determined that the animal presents within the warning area. After the specified period is elapsed, a warning output is canceled.

As described above, some animals behave in a herd. Thus, it cannot rule out the possibility that another animals of the same species might still be lurking around the vehicle, even if the detected animal has left the warning area. Further, because an animal generally moves at a high speed, and its behavioral pattern is often beyond our expectations, it cannot eliminate the possibility that animals might be lurking around the vehicle, even if it is determined that the animal has left the warning area. In contrast, a pedestrian does not have such habits. Therefore, where the physical object is a pedestrian, a warning is continuously given as long as the pedestrian is positioned within the warning area, and contrariwise where the physical object is an animal, a warning is continuously given for the specified period, even if the animal has left the warning area. This allows making a driver to aware a potential danger latent around the vehicle.

Understandingly, the extracted physical objects include a pedestrian and an animal in step S21 of a process shown in FIG. 3, and therefore it might be incorrectly determined that the both are present within the warning area. In this case, it is able to display a grayscale image on the display device 4 as well as to give a warning which is produced by combining the first mode with the second mode. Namely, a pedestrian is individually highlighted as far as the pedestrian is present within the warning area. Meanwhile, an animal is highlighted on the entire display image while the animal is present within the warning area, and for the specified period after the animal has left the warning area.

Figure 5:
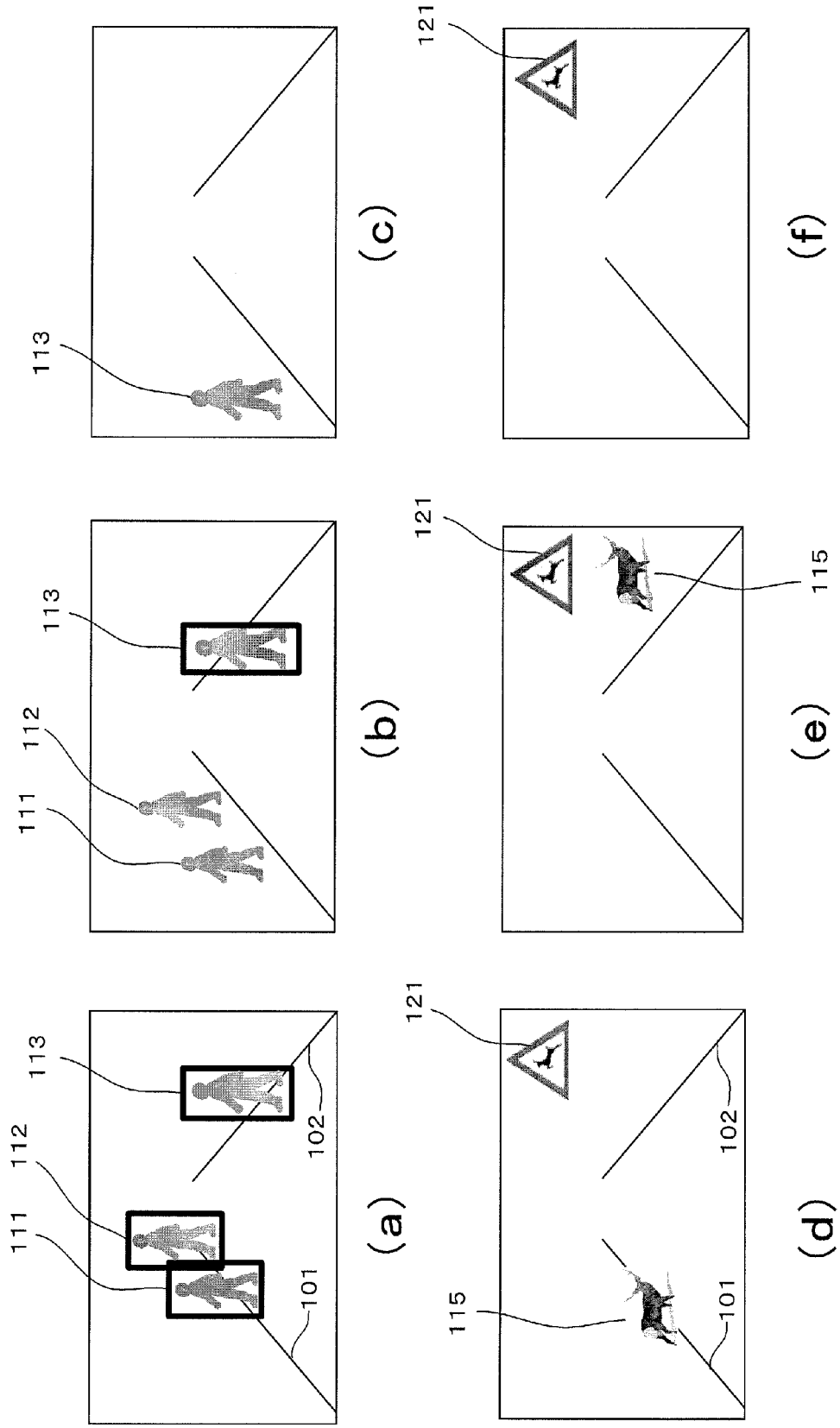
FIG. 5 is a view showing a display mode of a warning according to one embodiment of the present invention.

FIG. 5 is a schematic example of passage of time of a display to be displayed on the display device 4 for each case of a pedestrian and an animal following a process shown in FIG. 4. Herein, an area surrounded by a line 101 and a line 102 indicates the warning area.

It should be noted that since the pedestrian and the animal are living bodies, they will be displayed in brightness (i.e., in white) higher than a background in an actual gray scale image to be displayed on the display device 4, but are not depicted in line with such an actual display mode (in FIG. 4, the pedestrian and the animal are depicted more darker than the background) for easy identification in FIG. 5. The same thing applies to the following drawings.

In response to that three pedestrians 111 to 113 are positioned within the warning area at a point of time t1 shown in FIG. 5A, a warning according to the first mode is given. In other words, each of the three pedestrians 111 to 113 lying within the warning area are highlighted with a frame in the display image.

Whereas two pedestrians 111 and 112 has left the warning area at a subsequent point of time t2 shown in FIG. 5B, because a remaining one pedestrian 113 is still present within the warning area, a warning according to the first mode is uninterruptedly given. Put differently, the pedestrian 113 lying within the warning area is highlighted with a frame.

Because all the pedestrians 111 to 113 are not any longer present within the warning area at a subsequent point of time t3 shown in FIG. 5C, a warning output is prohibited. Therefore, no highlighting is done.

Contrarily, where the physical object is an animal, in response to the determination that the animal 115 is present within the warning area at a period of time t1 shown in FIG. 5D, a warning according to the second mode is given. In other words, in this embodiment, one icon image denoted by a reference numeral 121 is overlappingly displayed on the display image. The icon image 121 is one highlighting to be applied to the aforesaid entire display image. Herein, the icon image 121 indicates the possibility that plural animals might present around the vehicle. Here, it is desirable for the icon image 121 to display so as to attract driver's attention. For example, it is possible to display a triangle in red and to light or blink the icon image.

The animal 115 has left the warning area at a subsequent point of time t2 shown in FIG. 5E, but the aforesaid specified period is not yet elapsed. Thus, a warning according to the second mode is continuously given. Put differently, the entire highlighting by the icon image 121 is continued.

Since the animal 115 has left an imaging area (an area AR0 shown in FIG. 4) at a subsequent point of time t3 shown in FIG. 5F, the animal 115 is not displayed on the display device 4. However, as the aforesaid specified period is not yet elapsed, a warning according to the second mode i.e., the entire highlighting by the icon image 121 is continued. Thusly, because it cannot rule out the possibility that the animal and another animals of the same species might be lurking around the vehicle, a warning is continuously given, until the specified period elapses, even if the animal has left not only the warning area but also the imaging area. This enables making a driver to aware a potential danger latent around the vehicle.

Alternatively, an animal may entirely be highlighted by the icon image 121 as well as individually highlighted e.g., with a frame, as long as the animal is positioned within the warning area or the animal is present within the imaging area.

Figure 6:
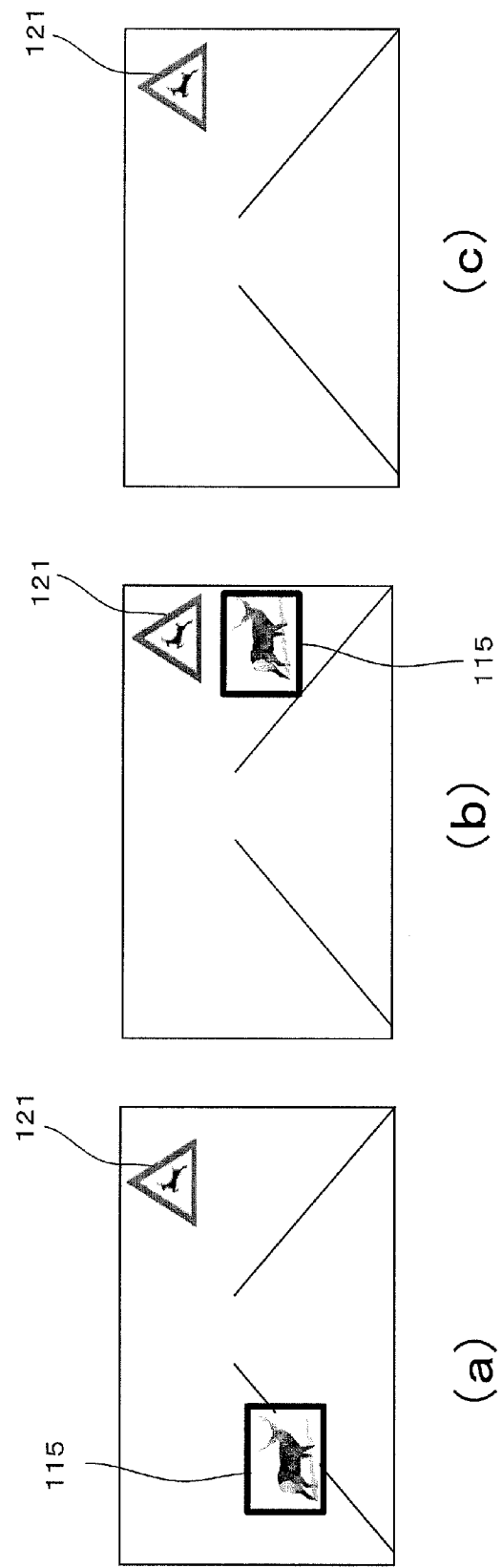
FIG. 6 is a view showing a display mode of a warning according to one embodiment of the present invention.

In this instance, a display image is generated as shown e.g., in FIG. 6. A difference from FIG. 5 is that highlighting with a frame is continued as long as the animal 115 is present within the imaging area.

In the above, a description is made to a mode of the warning output by display. Similarly, warning sound may be switched between an individual warning and an overall warning. For example, when a warning according to the first mode is given in step S25, a warning is given by sound or by voice for each of the physical objects, together with a warning by display. Accordingly, when plural physical objects are present within the warning area, warning by sound or by vice is repeated as many times as the corresponding number of the physical objects. On the contrary, when a warning according to the second mode is given in step S27, one warning by sound or by voice is given to all the physical objects (single or plural), together with a warning by display. Instead, it may vary types and contents between warning sound according to the first mode and warning sound according to the second mode.

Figure 7:
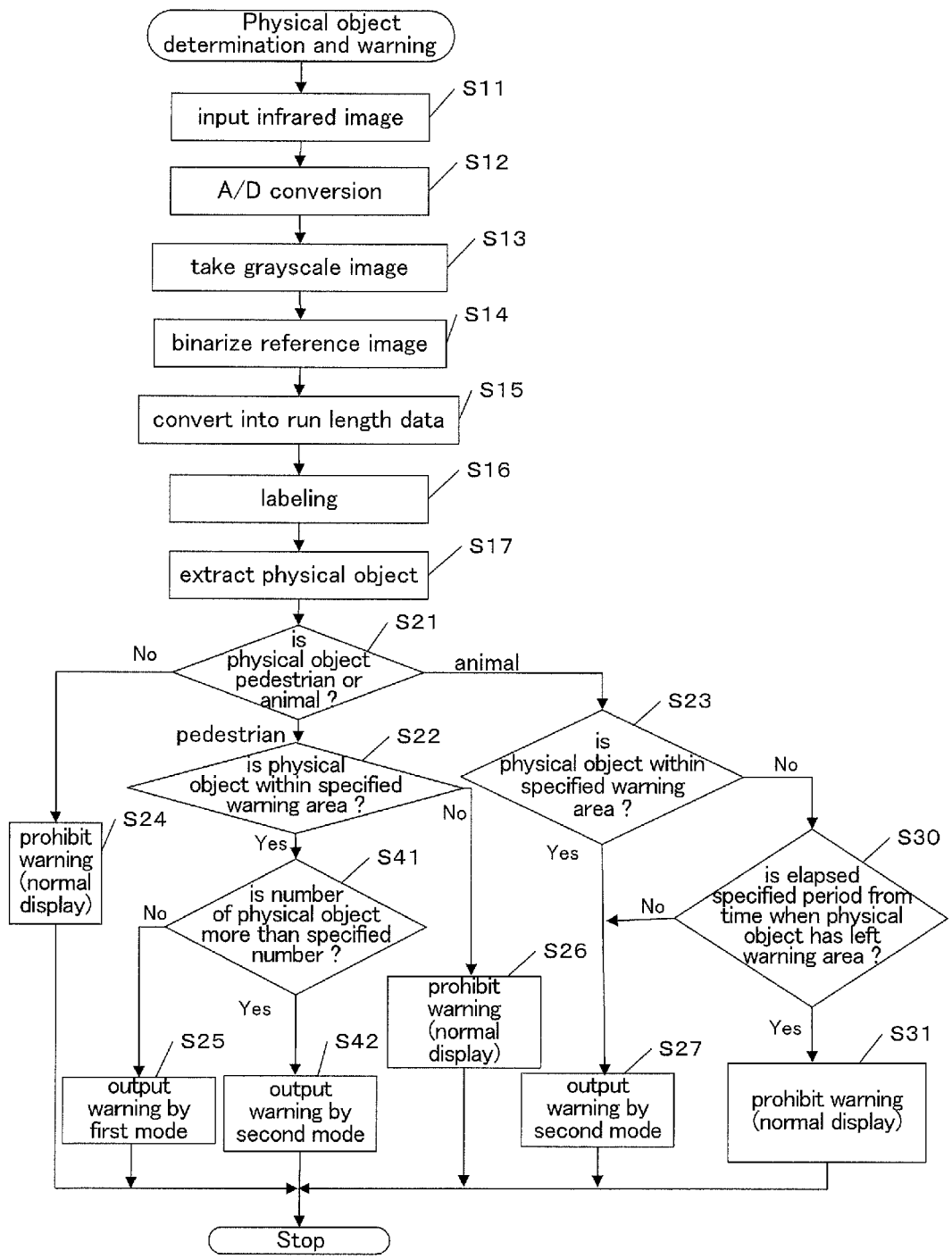
FIG. 7 is a flow chart showing a process in an image processing unit according to one embodiment of the present invention.

FIG. 7 is a flow chart showing a process to be executed by the image processing unit 2 according to another embodiment of the present invention. The process is executed at specified time intervals. An explanation will be made only to a point different from that shown in FIG. 3.

What is different from that shown in FIG. 3 is that steps S41 and S42 are added. In step S41, it is determined that a pedestrian who is determined to be present within the warning area is more than a specified number (e.g., 1). If the number of the pedestrian is not more than the specified number (i.e., less than the specified number), a result of the determination made in step S41 is No. The process then proceeds to step S25 where each pedestrian is displayed according to the first mode i.e., individually highlighted as mentioned above. If the number of the pedestrian is more than the specified number, a result of the determination in step S24 is Yes. The process then proceeds to step S42 where the pedestrian is displayed according to the second mode i.e., the entire display image is highlighted. The highlighting here may be different from that to the animal in step S27.

As stated referring to FIG. 3, when the physical objects extracted in step S21 includes a pedestrian and an animal, even in a mode shown in FIG. 7, it may combine a warning output to the pedestrian in step S25 or step S42 with a warning output to the animal in step 27.

Thus, in this embodiment, a mode of warning output is switched between the individual highlighting according to the first mode and the entire highlighting according to the second mode, depending on whether the number of pedestrian is more than the specified number.

The grounds why such switching has to do are shown below. When many pedestrians are present within the warning area, plural highlighting with a frame according to the first mode will be done. It is true that it is desirable to make a driver aware a warning as instantaneously as possible, but the larger the number of portions which are highlighted, the more hard to see a screen. On this account, the driver becomes difficult to instantaneously aware to which physical objects driver's attention should be paid. To avoid such inconvenience, when relatively many pedestrians are present within the warning area, this embodiment takes measures of switching a warning mode to the entire highlighting, in lieu of individual highlighting. Entirely highlighting allows the driver to instantaneously aware the presence of the plural pedestrians around the vehicle.

The switching for the pedestrian is also applicable to warning sound. As mentioned above, a warning can be given by one sound or by one voice to each of the physical objects in step S25, and a warning can be given by one sound or by voice to all the physical objects in step S42. Herein, the warning sound output in step S42 may be different in its kinds and contents from that output in step S25. Similarly, the warning sound output in step S42 may be different in its types and contents from that output in step S27 (a warning output according to the second mode where the physical object is an animal).

Figure 8:
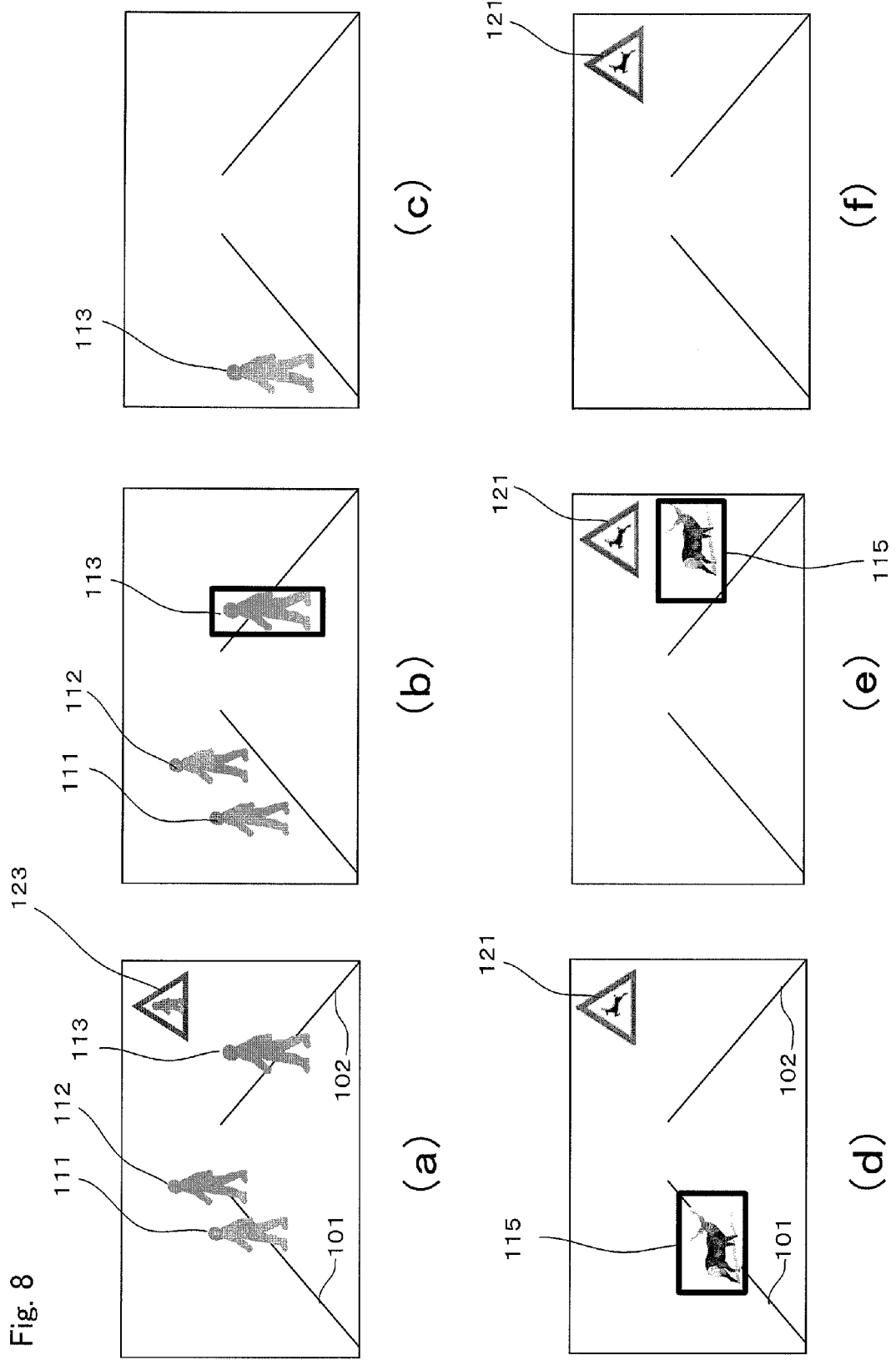
FIG. 8 is a view showing a display mode of a warning according to another embodiment of the present invention.

FIG. 8 shows one schematic example of passage of time of a screen to be displayed on the display device 4 for each case of a pedestrian and an animal following a process shown in FIG. 7. An area surrounded by a line 101 and a line 102 indicates the warning area. FIG. 5A to FIG. 5F are shown for comparison purpose but their descriptions are omitted as they are identical with those show in FIG. 6. The specified number appeared in step S41 is set to a value 1.

It is determined that three pedestrians 111 to 113 are positioned within the warning area at a point of time t1 shown in FIG. 7A. Because the number of pedestrian is 3, a display according to the second mode i.e., highlighting is done in step S42. As described above, when the physical object is an animal, one icon image denoted by a reference number 123 is overlapped on the display image. The icon image 123 is one highlighting to be applied to the aforesaid entire display image, which indicates that plural pedestrians exist. It is also preferable to display the icon image 123 so as to attract drive's attention as with the ion image 121. For example, it is possible to display a triangle in red and to light or blink the icon image.

In the icon image 123, a person is shown in a triangle and it is different from the icon image 121 in which an animal is shown in a triangle. In this way, a driver can aware whether the triangle warns that plural pedestrians are present, or that a danger exposed by the animal is impending, depending on which icon image is displayed.

Two pedestrians 111 and 112 have left the warning area at a point of time t2 shown in FIG. 7B, but a remaining one pedestrian 113 is still positioned within the warning area. Because the number of pedestrian lying within the warning are is 1, the pedestrian 113 is displayed according the first mode i.e., individually highlighted with a frame in step S25.

Because all the pedestrians 111 to 113 are not present within the warning area at a point of time t3 shown in FIG. 7C, a warning output is prohibited and no highlighting is done.

Thus, according to this embodiment, where the physical object is a pedestrian, a warning output is switched between the first mode and the second mode, depending on whether the number of pedestrian is more than the specified number. However, where the physical object is an animal, since it cannot eliminate, even single, the possibility that another animals of the same species might be lurking around the vehicle, as mentioned above, the animal is treated as plural (head), and a warning according to the second mode is always given. This provides a driver an easy-to-understand display where the physical object is a pedestrian, and makes the driver aware a danger latent around the vehicle where the physical object is an animal.

Incidentally, where the physical object is a pedestrian, highlighting in the image to be displayed is always limited to one spot by setting "the specified number" to 1 in step S41. Therefore, the driver can instantaneously aware what the warning displayed on the image indicates. It is to be noted that while the specified number is necessarily limited to 1, it is desirable to check up in advance when how many highlighting is done the driver feels difficult to see the image, and to set, based thereon, it to a number fewer than the number of highlighting where the driver begins to feel difficult to see.

In the above embodiment, the second mode is implemented in which one highlighting is done on the entire display image by overlappingly displaying an icon image designated by reference numerals 121 and 123 on a gay scale image. Nevertheless, a technique of entire highlighting is not necessarily limited thereto, and instead another mode may of course be possible.

Figure 9:
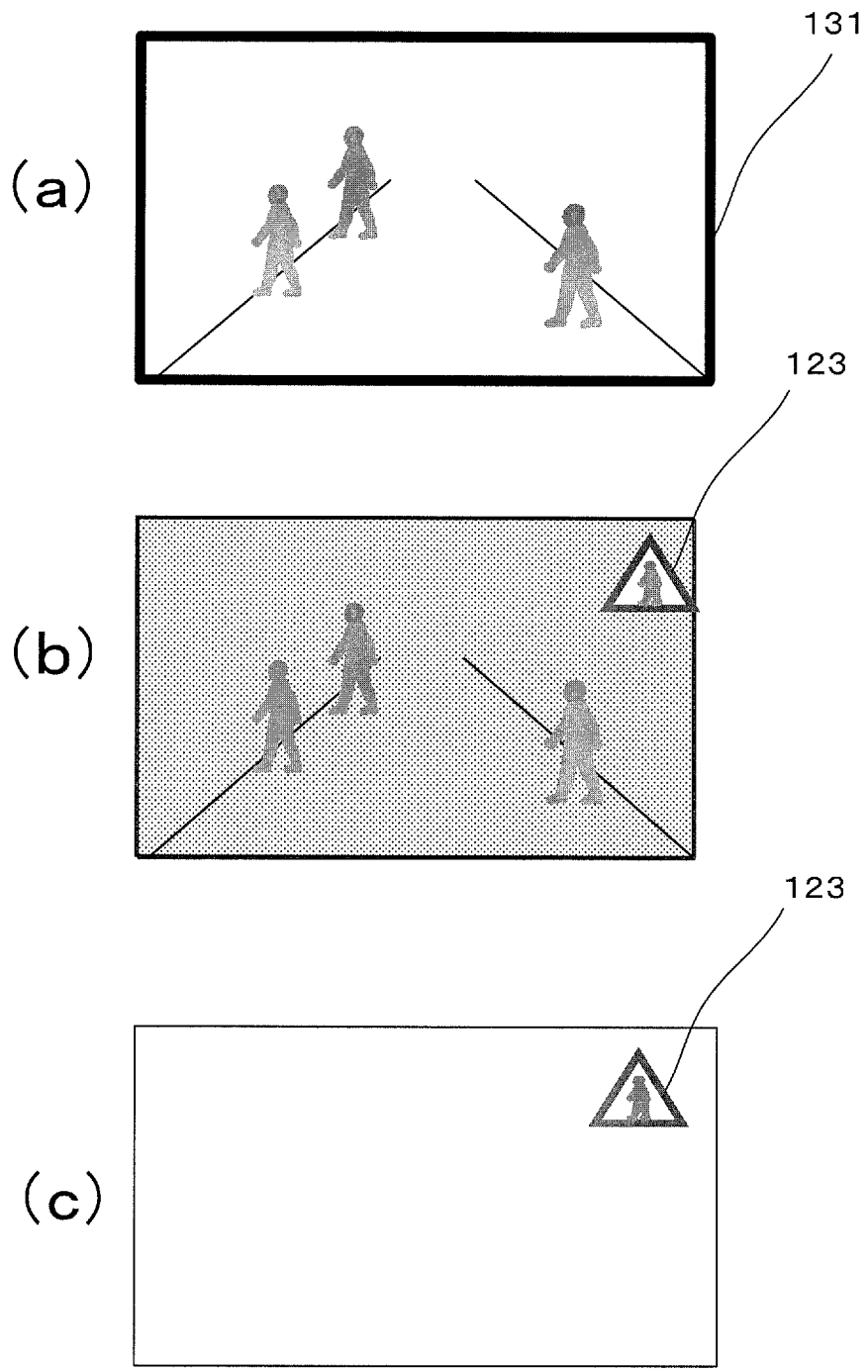
FIG. 9 is a view showing a display mode of a warning according to another embodiment of the present invention.

For example, one example of entire highlighting according to anther mode where the physical object is the pedestrian is shown e.g., in FIG. 9. In FIG. 9A, the entire highlighting according to the second mode is done by displaying an outer frame 131 so as to encircle an outer edge of an image to be displayed. The outer frame 131 can be changed in color (e.g., red or yellow) in such a manner as to attract driver's attention, and the outer frame 131 can be lighted or blinked.

In FIG. 9B, the overall brightness of the image taken is lowered (e.g., luminance of each pixel is lowered as many as a specified value) so as to display by half-tone dot meshing, the image is displayed in low contrast, and the icon image 123 is overlapped thereon. In FIG. 9C, only the icon image 123 is displayed without displaying the image taken. For the icon images shown in FIGS. 9B and 9C, lighting and blinking are possible. As is done in FIGS. 9B and 9C, it allows a driver to call driver's attention to carefully look ahead by intentionally causing the driver to be difficult to see the overall image taken, together with display of the icon image 122. These modes shown in FIG. 9 may likewise be applied to a warning output according to the second mode where the physical object is an animal.

In the aforesaid embodiments, an explanation is made to the case where the conflict determining area AR1 (FIG. 4) is the specified warning area around the vehicle, and a warning is given depending on whether the specified physical object is present within the warning area. Alternatively, a warning may be given not only to the physical object lying within the warning area but also to the physical object lying within the intrusion determining area AR2 or AR3, and is determined to be liable to intrude in the conflict determining area. Further, it may even be determined that there is the possibility that the vehicle might collide against the physical object, and if there is an enough potential of colliding, a warning may be given. These determination techniques are disclosed e.g., in JP 2001-6096 A.

Furthermore, while in the above-mentioned embodiments, the far infrared camera is used, the present invention may of course be applied to other types of camera (e.g., a visible camera).

As stated above, whereas a description is made to the specific embodiments of the present invention, the present invention is not intended to limit to these embodiments.

REFERENCE SIGNS LIST 1R, 1L: infrared camera (imaging means)
2: image processing unit
3: speaker
4: HUD

The invention claimed is:

1. A surrounding area monitoring apparatus comprising: an imaging device mounted on a vehicle that captures images around the vehicle;
 a image processing unit including a processor and a memory that are configured to:
  process images captured by the imaging device to detect a physical object lying around the vehicle;
  determine whether the physical object detected is a pedestrian or an animal; and
  provide a warning screen image to a display device, the warning screen image emphasizing the physical object that is within a specified area from the vehicle,
  wherein when the detected physical object is determined to be an animal and is within the specified area, the warning screen image is continuously displayed for a specified period after the animal is determined to no longer be in the specified area, and
  wherein when the detected physical object is determined to be a pedestrian, the warning screen image is turned off at a time when the pedestrian exists the specified area.

2. The apparatus according to claim 1, wherein the image processing unit is further configured to provide a warning screen image in a first mode, each physical object being separately highlighted in the warning screen image in the first mode.

3. The apparatus according to claim 2, wherein the image processing unit is further configured to provide a warning screen image in a second mode, presence of one or more physical objects within a specified area being indicated by an icon placed in the warning screen image in the second mode.

4. The apparatus according to claim 3, wherein the image processing unit is further configured to provide a warning screen image in the second mode to indicate presence of one or more animals in the specified area.

5. The apparatus according to claim 4, wherein the image processing unit is configured to continue to provide the warning screen image in the second mode to indicate presence of one or more animals for a specified period after the one or more animals have left the specified area.

6. The apparatus according to claim 3, wherein the image processing unit is configured to provide the warning screen image in combination of the first mode and the second mode.

7. The apparatus according to claim 1, wherein the imaging device comprises one or more cameras.

8. The apparatus according to claim 1, further comprising one or more speakers that produce warnings by sound or voice.

9. The apparatus according to claim 1, wherein the specified area has predefined dimensions originating from the vehicle.

10. The apparatus according to claim 1, wherein the continuously displayed warning screen image is displayed for the specified period based on a timer that is initiated when the animal is determined to no longer be in the specified area.

11. A surrounding area monitoring method for a vehicle having an imaging device mounted thereon that captures images around the vehicle, and an image processing unit including a processor and a memory, the method comprising:
   processing images captured by the imaging device to detect a physical object lying around the vehicle;
   determining whether the physical object detected is a pedestrian or an animal; and
   providing a warning screen image to a display device, the warning screen image emphasizing the physical object that is within a specified area from the vehicle,
   wherein when the detected physical object is determined to be an animal and is within the specified area, the method further includes:
      determining that the animal is no longer in the specified area;
      establishing a timer of a specified period after it is determined that the animal is no longer in the specified area; and
      continuously displaying the warning screen image for the specified period of the time after the animal is determined to no longer be in the specified area, and
   wherein when the detected physical object is determined to be a pedestrian, the method further includes turning off the warning screen image at a time when the pedestrian exists the specified area.

12. The method according to claim 11, wherein the image processing unit is further configured to provide a warning screen image in a first mode, each physical object being separately highlighted in the warning screen image in the first mode.

13. The method according to claim 12, wherein the image processing unit is further configured to provide a warning screen image in a second mode, presence of one or more physical objects within a specified area being indicated by an icon placed in the warning screen image in the second mode.

14. The method according to claim 13, wherein the image processing unit is further configured to provide a warning screen image in the second mode to indicate presence of one or more animals in the specified area.

15. The method according to claim 14, wherein the image processing unit is configured to continue to provide the warning screen image in the second mode to indicate presence of one or more animals for a specified period after the one or more animals have left the specified area.

16. The method according to claim 13, wherein the image processing unit is configured to provide the warning screen image in combination of the first mode and the second mode.

17. The method according to claim 11, wherein the imaging device comprises one or more cameras.

18. The method according to claim 11, further comprising one or more speakers that produce warnings by sound or voice.

19. The method according to claim 11, wherein the specified area has predefined dimensions originating from the vehicle.

* * * * *